US012665437B2

(12) United States Patent
Kuter-Arnebeck et al.

(10) Patent No.: US 12,665,437 B2
(45) Date of Patent: Jun. 23, 2026

(54) STORAGE UNIT WITH POWER MONITORING CAPABILITY

(71) Applicant: Snap-on Incorporated, Kenosha, WI (US)

(72) Inventors: Ottoleo Kuter-Arnebeck, Kenosha, WI (US); William J. Tadda, Jr., Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 18/642,349

(22) Filed: Apr. 22, 2024

(65) Prior Publication Data

US 2024/0275187 A1 Aug. 15, 2024

Related U.S. Application Data

(63) Continuation of application No. 17/151,985, filed on Jan. 19, 2021, now Pat. No. 11,990,779.

(51) Int. Cl.
*H02J 7/70* (2026.01)
*A47B 67/04* (2006.01)
(Continued)

(52) U.S. Cl.
CPC ............... *H02J 7/70* (2026.01); *A47B 81/00* (2013.01); *A47B 97/00* (2013.01); *H02J 7/80* (2026.01); *A47B 67/04* (2013.01)

(58) Field of Classification Search
None
See application file for complete search history.

(56) References Cited

U.S. PATENT DOCUMENTS 6,926,160 B2   8/2005   Perkins et al.
6,926,376 B2   8/2005   Arent et al.
(Continued)

FOREIGN PATENT DOCUMENTS

CN        105229562 A      1/2016
CN        106058651        10/2016
(Continued)

OTHER PUBLICATIONS

Taiwan Patent Office, Decision to Grant issued in corresponding Application No. 111101984, dated Oct. 22, 2024, 5 pp.
(Continued)

*Primary Examiner* — Thomas S Mccormack
(74) *Attorney, Agent, or Firm* — Taft, Stettinius & Hollister LLP

(57) ABSTRACT

A storage unit, such as, for example, a toolbox or cabinet, having a power strip with power terminals adapted to operably couple to and provide electricity to a connected device. The storage unit further including an interrogation module adapted to interrogate or monitor electric supply information about electricity supplied to the connected devices via the power terminals, a computation module operably coupled to the interrogation module, and adapted to receive electric supply data signals from the interrogation module to determine a status of the connected device by comparing the electric supply data signals and usage characteristics of the connected device, and a communication module adapted to receive status data signals from the computation module and communicate the status data signals to a remote computing device.

13 Claims, 7 Drawing Sheets

(51) Int. Cl.
| | |
|---|---|
| *A47B 81/00* | (2006.01) |
| *A47B 97/00* | (2006.01) |
| *H02J 7/80* | (2026.01) |

(56) References Cited

U.S. PATENT DOCUMENTS

| | | | |
|---|---|---|---|
| 6,976,744 | B2 | 12/2005 | Hay et al. |
| 7,130,190 | B1 | 10/2006 | Baker |
| 7,140,701 | B2 | 11/2006 | Arent et al. |
| 7,147,115 | B2 | 12/2006 | Perkins et al. |
| 7,147,290 | B2 | 12/2006 | Arent et al. |
| 7,274,303 | B2 | 9/2007 | Dresti et al. |
| 7,462,951 | B1 | 12/2008 | Baarman |
| 7,745,954 | B1 | 6/2010 | Menas |
| 8,157,337 | B2 | 4/2012 | Manalang et al. |
| 8,305,737 | B2 | 11/2012 | Ewing et al. |
| 8,321,163 | B2 | 11/2012 | Ewing et al. |
| 8,368,379 | B2 | 2/2013 | Gruetter et al. |
| 8,494,661 | B2 | 7/2013 | Ewing et al. |
| 8,694,272 | B2 | 4/2014 | Ewing et al. |
| 9,007,186 | B1 | 4/2015 | Krummey et al. |
| 9,142,971 | B2 | 9/2015 | Ewing et al. |
| 9,166,440 | B2 | 10/2015 | Ben-Shalom et al. |
| 9,184,632 | B2 | 11/2015 | Kirby et al. |
| 9,331,524 | B1 | 5/2016 | Yetter |
| 9,352,905 | B2 | 5/2016 | Fly et al. |
| 9,705,330 | B1 | 7/2017 | Yetter |
| 9,760,140 | B1 | 9/2017 | Krummey et al. |
| 9,898,026 | B2 | 2/2018 | Ewing et al. |
| 9,952,261 | B2 | 4/2018 | Ewing et al. |
| 10,306,993 | B1 | 6/2019 | Clarke |
| 10,379,167 | B2 | 8/2019 | Newport et al. |
| 2005/0156564 | A1* | 7/2005 | Krieger ............... H01M 50/296 |
| | | | 320/112 |
| 2005/0280339 | A1 | 12/2005 | Perkins et al. |
| 2007/0058344 | A1 | 3/2007 | Baker |
| 2009/0251127 | A1 | 10/2009 | Kim |
| 2011/0071694 | A1 | 3/2011 | Mammone |
| 2011/0300904 | A1* | 12/2011 | Osaka ............... H04M 1/72403 |
| | | | 455/556.1 |
| 2013/0338844 | A1 | 12/2013 | Chan et al. |
| 2014/0350716 | A1* | 11/2014 | Fly ........................... B25H 3/00 |
| | | | 700/214 |
| 2015/0171632 | A1 | 6/2015 | Fry et al. |
| 2016/0141810 | A1 | 5/2016 | Kashyap et al. |
| 2018/0095138 | A1 | 4/2018 | Newport et al. |
| 2018/0157284 | A1 | 6/2018 | Ewing et al. |
| 2018/0231238 | A1 | 8/2018 | Burch et al. |
| 2019/0081462 | A1 | 3/2019 | Burch |
| 2020/0108819 | A1 | 4/2020 | Revach et al. |
| 2020/0171646 | A1 | 6/2020 | Liu |
| 2020/0403425 | A1 | 12/2020 | Fry et al. |

FOREIGN PATENT DOCUMENTS

| | | |
|---|---|---|
| EP | 3471522 | 4/2019 |
| EP | 3506454 | 7/2019 |
| EP | 3591792 | 1/2020 |
| WO | 2014189972 | 11/2014 |

OTHER PUBLICATIONS

Canadian Patent Office, Examination Report issued in corresponding Application No. 3,144,746, dated Oct. 8, 2024, 5 pp.

Search Report for corresponding Application No. GB2200632.4 dated Jul. 7, 2022, 1 page.

Examination Report No. 1 for corresponding Application No. 2022200185 dated Nov. 18, 2022, 6 pages.

Examination Report for corresponding Application No. GB2200632.4 dated Jan. 13, 2023, 4 pages.

Office Action for corresponding Application No. 3,144,746 dated Feb. 9, 2023, 6 pages.

Taiwan Office Action for corresponding TW Application No. 111101984, dated Apr. 26, 2023, 14 pages.

United Kingdom Combined Search and Examination Report for corresponding Application No. GB2310536.4 dated Aug. 25, 2023, 5 pages.

Australian Examination Report for corresponding Application No. 2022200185 dated Sep. 6, 2023, 4 pages.

Taiwan Office Action for corresponding Application No. 111101984 dated Sep. 21, 2023, 4 pages.

Canadian Patent Office, Examination Report issued in corresponding Application No. 3,144,746, dated Sep. 4, 2025, 7 pp.

Australian Patent Office, Examination Report No. 2 issued in corresponding Application No. 2024201190, dated Jan. 14, 2026, 5 pp.

Chinese Patent Office, First Office Action issued in corresponding Application No. 202210044548.0, dated Jan. 19, 2026, 13 pp.

\* cited by examiner

502 — Receive data signals from interrogation module

504 — Determine usage characteristics

506 — Compare determined usage characteristics with received data signals

508 — Determine a status based on the comparison

510 — Communicate the status

STORAGE UNIT WITH POWER MONITORING CAPABILITY

CROSS REFERENCES TO RELATED APPLICATIONS

This application is a continuation of, and claims the priority benefit of, U.S. patent application Ser. No. 17/151, 985, filed Jan. 19, 2021, the content of which is incorporated herein by reference in its entirety.

TECHNICAL FIELD

The present invention relates generally to a storage unit equipped with power outlets adapted to interpret a status of devices electrically coupled thereto.

BACKGROUND

Storage units, such as, for example, toolboxes and cabinets, may be provided with power outlets, for example, a power strip, to provide power to a variety of electrical devices, such as, for example, battery chargers. Battery chargers are commonly used in automotive, industrial, and household applications to charge batteries that function as a power source for tools, such as motorized ratchet wrenches, drivers, impact tools, and drills, for example. Battery chargers typically indicate the charge status or state of the battery being charged by using a gauge indicator (e.g. incremental LED lights) on the exterior of the housing to signify the charge state of the battery. However, when connected to a power outlet of a storage unit, the battery charger may be charging a battery some distance away from an operator, or otherwise the charge state is not easily viewable or accessible, such as when the power outlet is disposed in an interior containment space of the storage unit, thus the charge state of the battery is often difficult to ascertain. Additionally, battery chargers are typically connected to electrical circuits that are unable to detect potential problems with the battery and/or battery charger. Thus, damage to the circuit, battery charger, and/or battery can occur.

SUMMARY

The present invention relates broadly to a storage unit having one or more power outlets disposed on, for example, a power strip. The storage unit is adapted to determine a status of devices, such as, for example, batteries, electrically connected to the power outlets via a battery charger by measuring power, voltage, and/or current of the electricity supplied to a device via the power outlets. The status of the devices includes one or more of a state of charge of a battery that is connected to a battery charger, the supplied current and/or voltage to the battery, and the number of charge cycles. The determined status can be sent to a remote computing device, such as, for example, a phone, tablet, computer, etc. via wireless communications link.

In an embodiment, the present invention broadly comprises a storage unit having containment spaces. The storage unit includes power terminals adapted to operably couple to and provide electricity to a connected device, an interrogation module operably coupled to the power terminals and adapted to interrogate or monitor electric supply information about electricity supplied to the connected devices via the power terminals, a computation module operably coupled to the interrogation module and adapted to receive electric supply data signals from the interrogation module and determine a status of the connected device by comparing the electric supply data signals and usage characteristics of the connected device based on known or preset data, and a communication module operably coupled to the computation module and adapted to receive status data signals from the computation module and communicate the status data signals to a remote computing device.

In another embodiment, the present invention broadly comprises a power strip having power terminals adapted to operably couple to and provide electricity to a connected device. The power strip includes an interrogation module operably coupled to the power terminals and adapted to interrogate or monitor electric supply information about electricity supplied to the connected devices via the power terminals, a computation module operably coupled to the interrogation module and adapted to receive electric supply data signals from the interrogation module and determine a status of the connected device by comparing the electric supply data signals and usage characteristics of the connected device based on known or preset data, and a communication module operably coupled to the computation module and adapted to receive status data signals from the computation module and communicate the status data signals to a remote computing device.

In another embodiment, the present invention broadly comprises a power strip having power terminals adapted to operably couple to and provide electricity to a connected device. The power strip includes interrogation modules adapted to interrogate or monitor electric supply information about electricity supplied to the connected devices via the power terminals, each of the interrogation modules is operably coupled to one of the power terminals, a computation module operably coupled to the interrogation modules and adapted to receive electric supply data signals from the interrogation modules and determine a status of the connected device by comparing the electric supply data signals and usage characteristics of the connected device based on known or preset data, and a communication module operably coupled to the computation module and adapted to receive status data signals from the computation module and communicate the status data signals to a remote computing device.

In another embodiment, the present invention broadly comprises a method performed by a computing device to communicate a status of a connected device operably coupled to and adapted to receive electricity supplied by power terminals disposed in storage unit. The method includes receiving electric supply data signals from an interrogation module containing information about electricity supplied to the connected device, determining a status of the connected device by comparing the information from the electric supply data signals with usage characteristics of the connected device, and communicating, via a communication module, a status data signal indicating the status of the remote computing device.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1A:
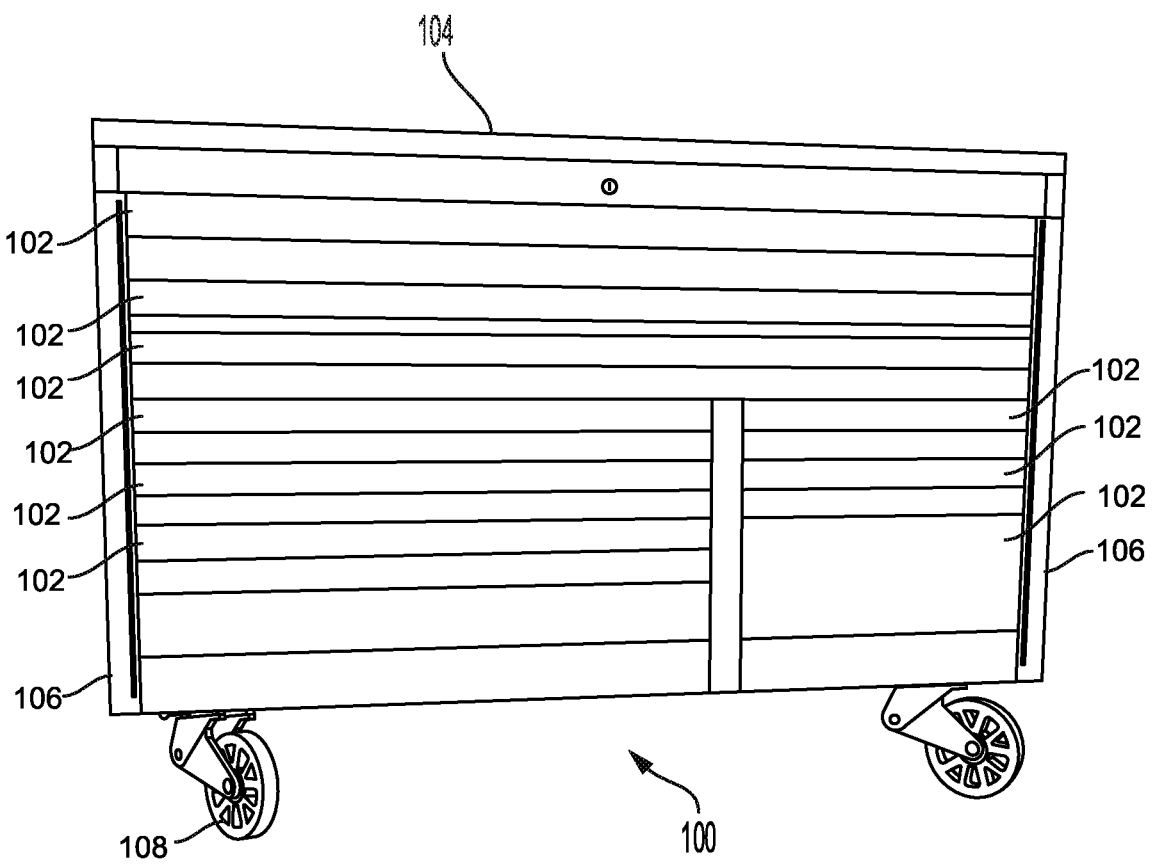
FIG. 1A is a perspective side view of an exemplar storage unit, according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a storage unit having one or more power outlets disposed on, for example, a power strip. The storage unit is able to output data wirelessly and/or by a wired connection. The data includes information regarding the status of, or other information relating to, a device electrically connected to and receiving power from the power outlet, such as, for example, a battery or batteries that are operably coupled to a battery charger. The data can be communicated to a remote computing device, such as, for example, a remote server and/or a mobile computing device, such as, for example, a mobile phone. The communicated data enhances the ability of an operator to monitor the status of the battery being charged by the battery charger, including remote monitoring, compared to current solutions.

Figure 1B:
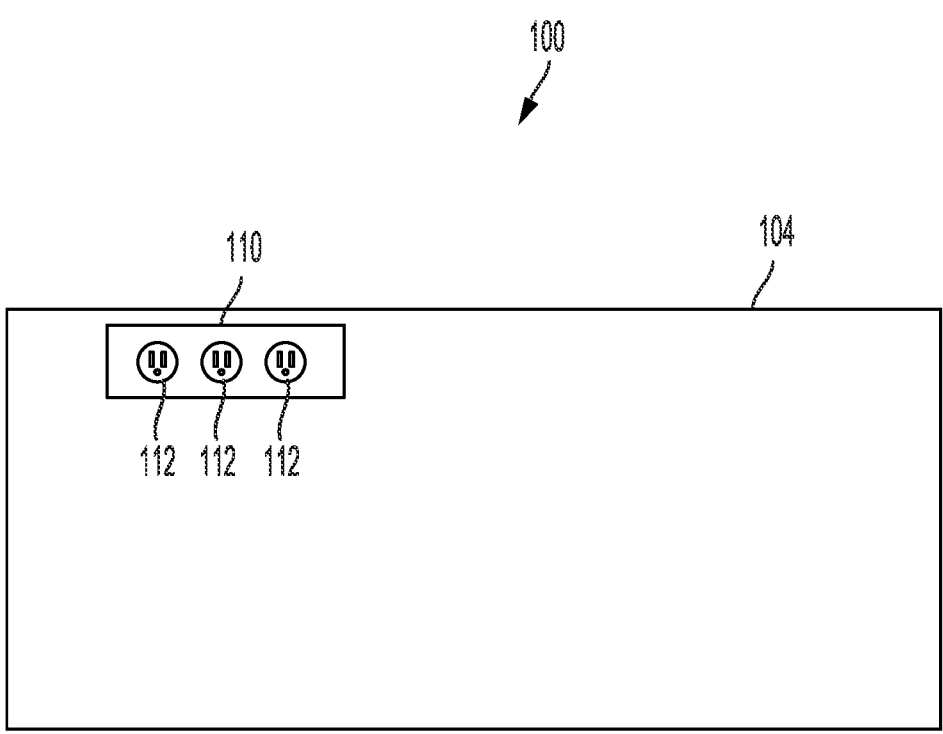
FIG. 1B is a top view of the storage unit of FIG. 1A.
Figure 2:
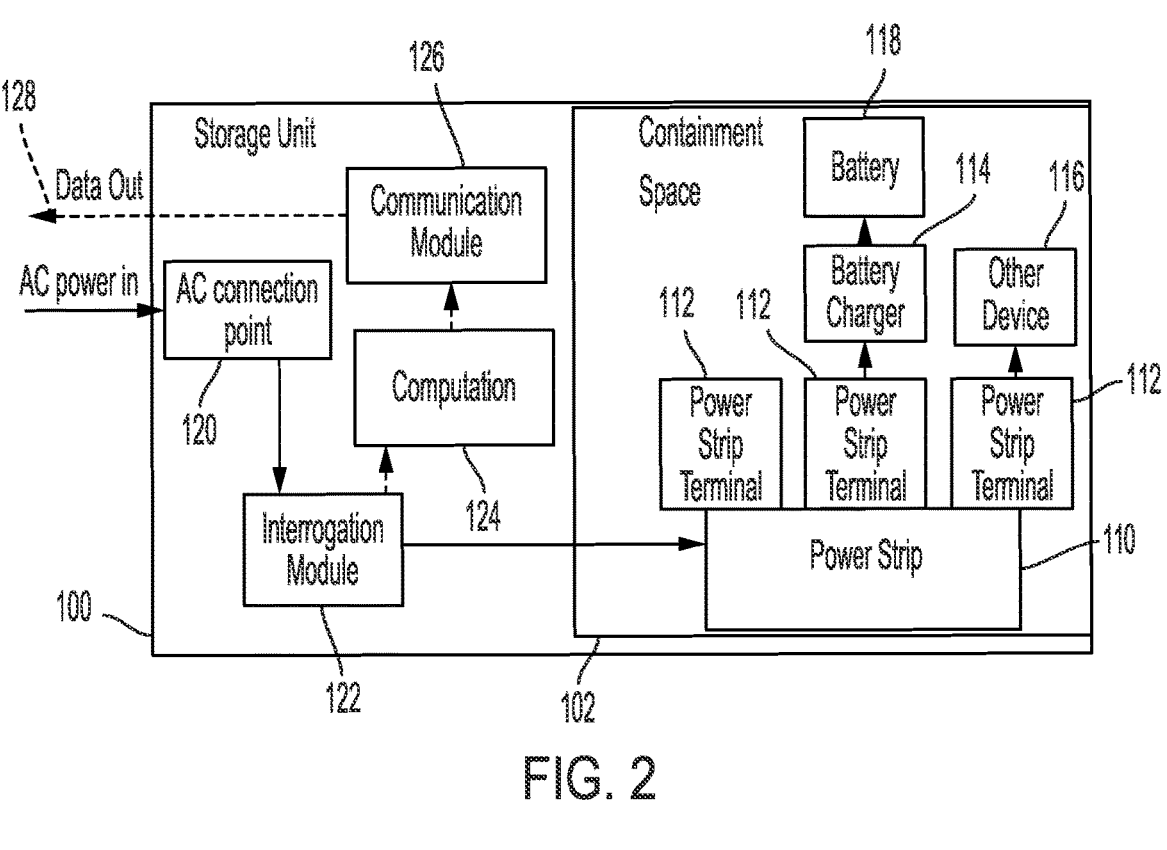
FIG. 2 is a block diagram conceptually illustrating example electronic components of a storage unit in accordance with an embodiment of the present invention.

Referring to FIGS. 1A and 1B, a storage unit 100, such as, for example, a toolbox or cabinet, includes a number of containment spaces 102, such as, for example, drawers, a work surface 104, trim pieces 106, and/or wheels 108 such that the storage unit 100 is movable to a different location at a worksite. The storage unit 100 may be coupled to an external power source (not shown) via a cord or other type of wired connection. The external power source is adapted to supply power, for example, AC power in a range of approximately 120V to 240V. In another embodiment, electrical power is provided by electric battery(ies), fuel cell(s), solar power, etc. via a power source that is external to the storage unit 100 or housed within the storage unit 100, such as within the trim piece 106, the containment space 102, and/or a special compartment. The electrical power may also be supplied as DC voltage of, for example, approximately between 9V to 60V.

The storage unit 100 includes a power strip 110 disposed in the containment space 102, on the work surface 104, and/or other suitable surface of the storage unit 100. The power strip 110 includes one or more power terminals (also referred to as a power outlet) 112 adapted to operably couple to a connected device, such as, for example, a battery charger 114, rechargeable electric devices 116 with integrated rechargeable battery(ies), such as, for example, battery powered lights, mobile phones, tablets, etc., and/or other electrically powered devices, to provide electricity thereto. The battery charger 114 is adapted to be operably coupled to and charge a battery 118 in a well-known manner. For example, the present invention could work in conjunction with a battery charger adapted to output data wirelessly and/or by a wired connection, such as the battery charger disclosed in U.S. patent application Ser. No. 16/852,144, incorporated herein by reference. The data provided by the battery charger can provide additional information regarding the status of, or other information relating to, the battery or batteries that are operably coupled to the battery charger.

The storage unit 100 is adapted to determine a status of the connected device, such as, for example, a battery 118 coupled to the charger 114 and/or the battery(ies) of the rechargeable electric devices 116 and further includes a supply power connection point 120, an interrogation module 122, a computation module 124, and a communication module 126. The status may include, for example, charge state, charge cycles, and/or battery health.

Electricity supplied via the external power source is received at the supply power connection point 120. The supply power connection point 120 is disposed within or on the storage unit 100 and is adapted to operably couple to the interrogation module 122 and supply electricity to the power terminals 112.

The interrogation module 122 is operably coupled to the power strip 110 and power terminals 112 and adapted to interrogate or monitor electric supply information, such as, for example, power, current, and/or voltage values, of electricity supplied to the connected devices, such as the battery charger 114 and/or rechargeable electric devices 116, via the power terminals 112. The interrogation module 122 includes one or more of a voltmeter, an ammeter, and/or a wattmeter. The interrogation module 122 is adapted to operably couple to and send electric supply data signals containing the electric supply information to the computation module 124.

The computation module 124 is a controller/processor that includes a central processing unit (CPU) for processing data and computer-readable instructions using known methods. For example, the computation module 124 retrieves instructions from data storage via a bus, using a memory for runtime temporary storage of instructions and data. The memory may include volatile and/or nonvolatile random access memory (RAM). In an embodiment, the instructions stored in the memory are received and/or updated remotely using the communication module 126 to communicate with a remote computing device using a wired connection and/or a wireless transmission 128. The components may also be connected to other components in addition to (or instead of) being connected to other components via the bus. The computation module 124 monitors, analyzes, and processes electric supply data signals from the interrogation module 122 to determine electric supply usage characteristics of the connected devices based on known/preset data. The usage characteristics are then used to determine the status of the connected devices by comparing received data signals with the usage characteristics. In another embodiment, the usage characteristics may be retrieved from a database and saved in the memory. In another embodiment, the computation module 124 analyzes electric supply data signals from the interrogation module 122 data over time to determine new patterns and determine electric supply usage characteristics of the connected devices based on prior known data or first instructions using a machine learning algorithm. The method of determining the status of the connected devices is described in more detail below. The computation module 124 is adapted to operably couple to and send status data signals containing the status to the communication module 126. The status data signals may include interpreted or raw data.

The communication module 126 can further format status data signals for communication. The communication module 126 transmits status data signals including the status of the connected devices using a wired connection and/or a wireless transmission 128 to one or more remote computing devices, such as one or more mobile computing devices and/or one or more remote servers. The communication module 126 can include a transmitter, a receiver (also referred to as a transceiver) and associated encoders, modulators, demodulators, and decoders. The communication module 126 manages and establishes communication links 130 with a mobile computing device 132 via one-or-more antennas (not shown), thereby enabling bi-directional communication between the tool storage unit 100 and a software application executed by the mobile computing device 132. The communication links 130 may be a direct link between the storage unit 100 and the mobile computing device 132 (as illustrated), or may be an indirect link through one-or-more intermediate components, such as via a Wi-Fi router or mesh connection (not illustrated).

Figure 7:
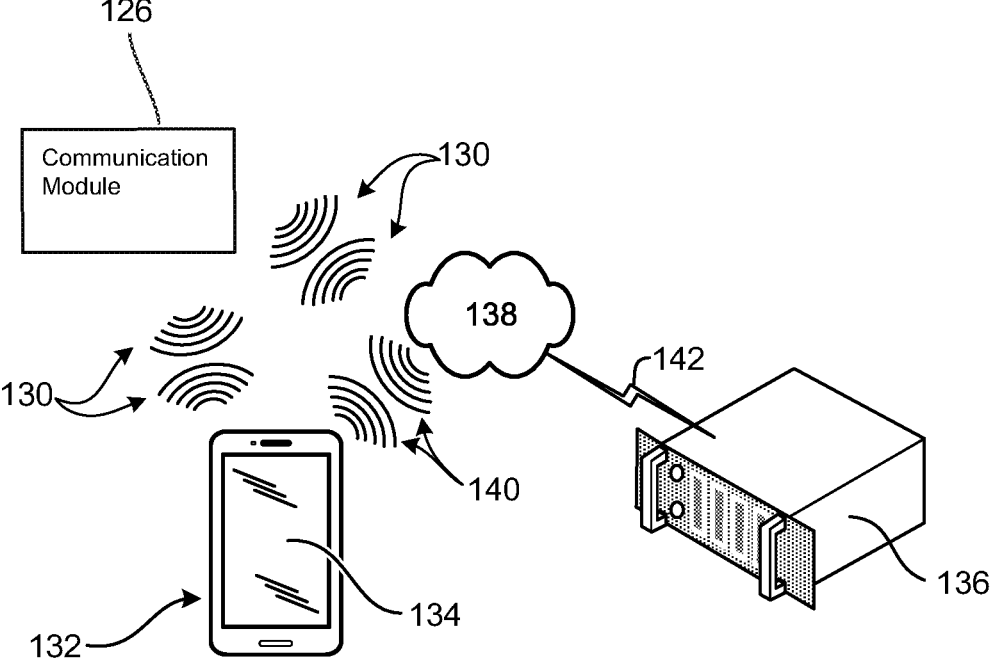
FIG. 7 illustrates an example of a system including a battery charger and a remote computing device.

Referring to FIG. 7, an example of a system including the communication module 126 disposed in a storage unit 100 and a mobile computing device 132. The communication module 126 communicates with the mobile computing device 132 via a wireless transmission 128 by establishing the communication link 130 using a protocol such as infrared, Bluetooth, Bluetooth Smart (also known as Bluetooth low energy), Wi-Fi, or any other suitable wireless protocol. In an embodiment, the mobile computing device 132 includes a touch-sensitive display 134 via which an operator interacts with user interfaces provided by a software application on the mobile computing device 132. Among other things, the software application may be used to display battery status and/or battery information, such as the state of charge the battery 118 that is connected to the charger 114 and/or of the battery(ies) of the rechargeable electric device 116, the supplied power, current, and/or voltage values to the power terminals 112, the number of charge cycles, health status about the battery(ies), etc. The software application also provides the technician with real-time feedback and interactive functionality to assist the operator with determining the status of the connected device.

In another embodiment, the communication module 126 also communicates the status with one or more remote servers 136 via wireless transmission 128 by establishing the communication link 130 to a data communications network 138, such as the Internet. The communication link 130 may use, for example, a protocol such as infrared, Bluetooth, Bluetooth Smart (also known as Bluetooth low energy), Wi-Fi, or any other wireless protocol to link with a local wireless router. In this embodiment, the mobile computing device 132 retrieves or receives data, which may include battery status and/or battery information, via a wireless communications link 140 to the data communications network 138. The wireless communications link 140 may be, for example, a Wi-Fi link between the mobile computing device 132 and a local wireless router, or a cellular data link between the mobile computing device 132 and a nearby cell tower, using a cellular protocol such as Long Term Evolution (LTE), Global System for Mobile Communications (GSM), Code Division Multiple Access (CDMA), etc. One-or-more remote servers 136 are connected to the data communications network 138 via communications link(s) 142. Based on queries received from the software application on the mobile computing device 132, the remote server 136 transmits data, which may include battery status and/or battery information to the mobile computing device 132 via the data communications network 138. Among other system arrangements, the remote server(s) 136 may be associated with a software service provider, a manufacturing company, or with a company providing repair services.

Figure 5:
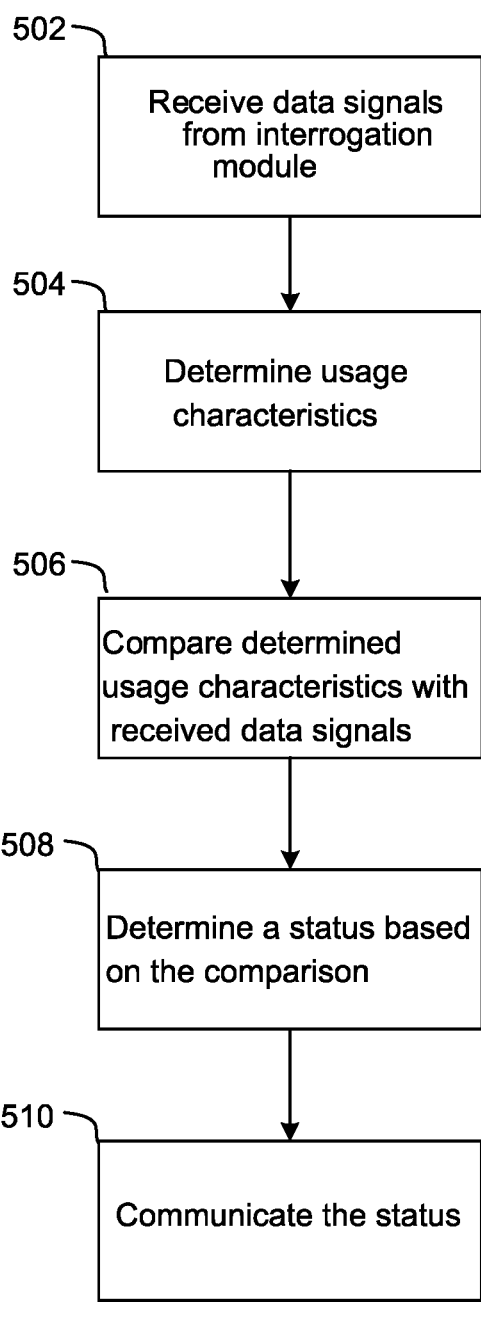
FIG. 5 is a flow chart illustrating a method to communicate a status of a battery being charged in accordance with an embodiment of the present invention.

FIG. 5 is a method performed by a computing device, such as the computation module 126, to communicate a status of a battery being charged via electricity supplied by power terminals 112. For example, the computation module 126 receives (502) electric supply data signals from the interrogation module containing information, such as, for example, power, current, and/or voltage values, of electricity supplied to the connected devices, such as the battery charger 114 and/or rechargeable electric devices 116, via the power terminals 112. The computation module 126 determines (504) usage characteristics of the connected devices by monitoring, analyzing, and processing electric supply data signals from the interrogation module 122 over time. The computation module 126 compares (506) the information from the electric supply data signals received from the interrogation module 122 with the determined usage characteristics. A status of the battery is determined (508) based on the comparing step. The computation module 124 communicates status data signals containing the status to the communication module 126, which communicates (510) the status data signal including the status using a wireless transmission 128 to a remote computing device, such as one or more mobile computing devices 132 and/or one or more remote servers 136. The battery status can then be displayed on a display of the one or more mobile computing devices 132 and/or the one or more remote servers 136.

Figure 6:
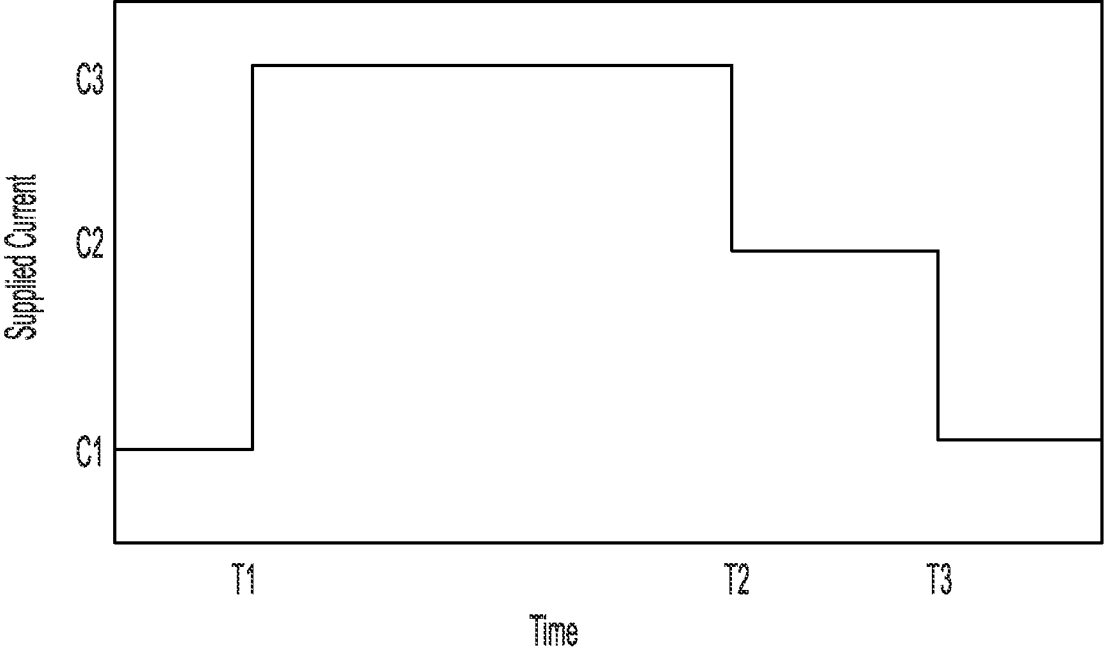
FIG. 6 is a chart illustrating an exemplar characteristic profile of electrical consumption of a battery being charged by a battery charger in accordance with an embodiment of the present invention.

The typical electrical consumption of a charging battery is demonstrated by the electrical consumption profile illustrated in FIG. 6. This profile is an interpretation of current supplied by an electrical circuit to a power terminal and where a battery charger is plugged into the power terminal to charge a battery. For example, the upper limit of the drawn voltage is close to the typical base units of common batteries, such as, for example, 9V, 14.4V, 18V, 24V, 64V, etc. By determining the electrical consumption profile of a battery, the computation module 124 can send a signal to a remote computing device via the communication module 126 to indicate a status of the battery, such as, for example, the battery is fully charged, an electrical overload, and/or a parasitic drain. The computation module 126 is adapted to interpret the status of the battery 118 being charged by a battery charger 114 using the electrical consumption profile and the information received from the interrogation module 122. For example, prior and up to time T1, the battery charger 114 places a parasitic load C1 on the electrical circuit. At time T1, the battery 118 is connected to the battery charger 114 to charge, thereby increasing the electrical current to level C3. When the battery 118 reaches a certain charge state, such as, for example, 75-80% of full charge, the circuit drops the current draw to level C2 at time T2, where level C2 is less than level C3 and greater than level C1. When the battery 118 is fully charged, the current draw drops again to approximately level C1 at time T3.

The concepts disclosed herein may be applied within several different devices and computer systems. Although the mobile computing device 132 is described as a mobile device, any computer may be used. Likewise, the remote server(s) 136 may be any sort of computer.

Figure 3:
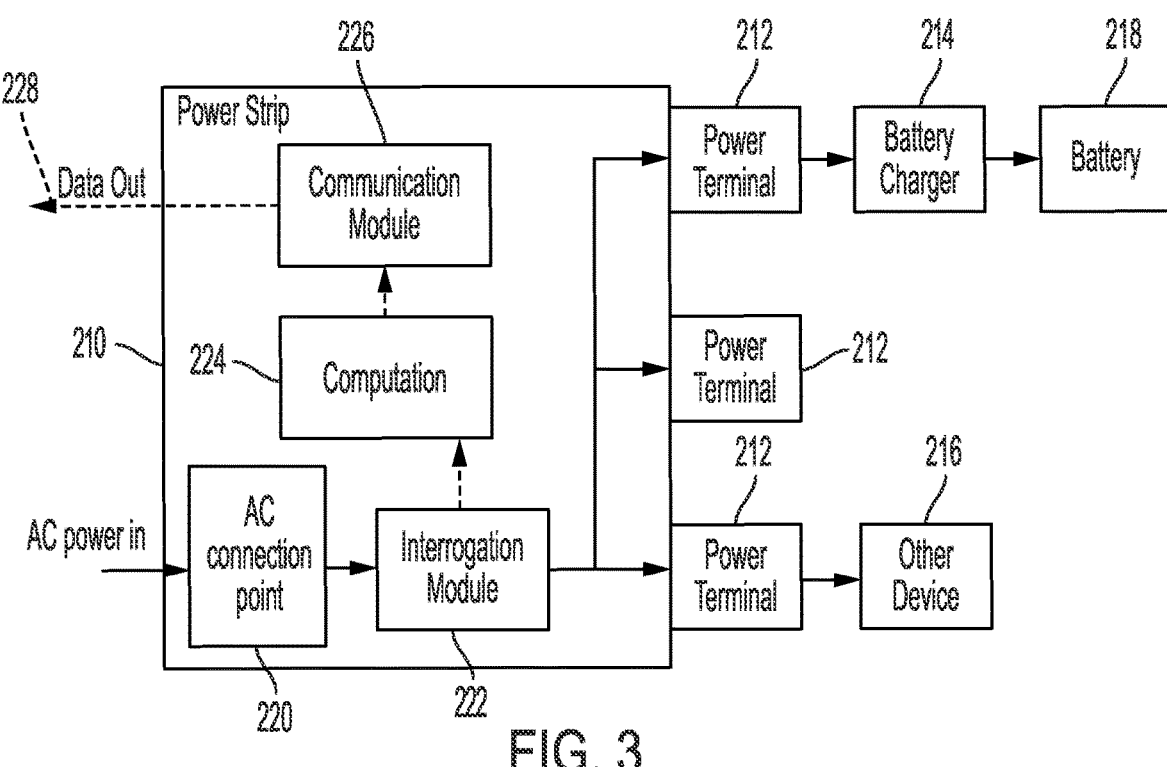
FIG. 3 is a block diagram conceptually illustrating example electronic components of a power strip in accordance with another embodiment of the present invention.

In another embodiment, as shown in FIG. 3, a power strip 210 includes power terminals 212, a supply power connection point 220, an interrogation module 222, a computation module 224, and a communication module 226 (which are substantially similar to the power terminals 112, supply power connection point 120, interrogation module 122, computation module 124, and communication module 126 described above). The power strip 210 can be disposed in a storage unit, such as, for example, a tool box or cabinet, that is substantially similar to the storage unit 100 described above. For example, the power strip can be disposed in a containment space, such as for example, a drawer, on a work surface, or other suitable surface of the storage unit.

Similar to the power terminals 112 described above, the power terminals 212 are adapted to operably couple to a connected device, such as, for example, a battery charger 214, rechargeable electric devices 216 with integrated rechargeable battery(ies), such as, for example, battery powered lights, mobile phones, tablets, etc., and/or other electrically powered devices, to provide electricity thereto. The battery charger 214 is adapted to be operably coupled to and charge a battery 218 in a well-known manner. Similar to the storage unit 100 described above, the power strip 210 is adapted to determine a status of the connected device, such as, for example, a battery 218 coupled to a charger 214 and/or the battery(ies) of the rechargeable electric devices 216 in a similar manner as described above. The status may include, for example, charge state, charge cycles, and/or battery health. The communication module 226 is adapted to then transmit data signals including the status of the connected devices using a wired connection and/or a wireless transmission 228 to one or more computing devices, such as one or more mobile computing devices and/or one or more remote servers.

Figure 4:
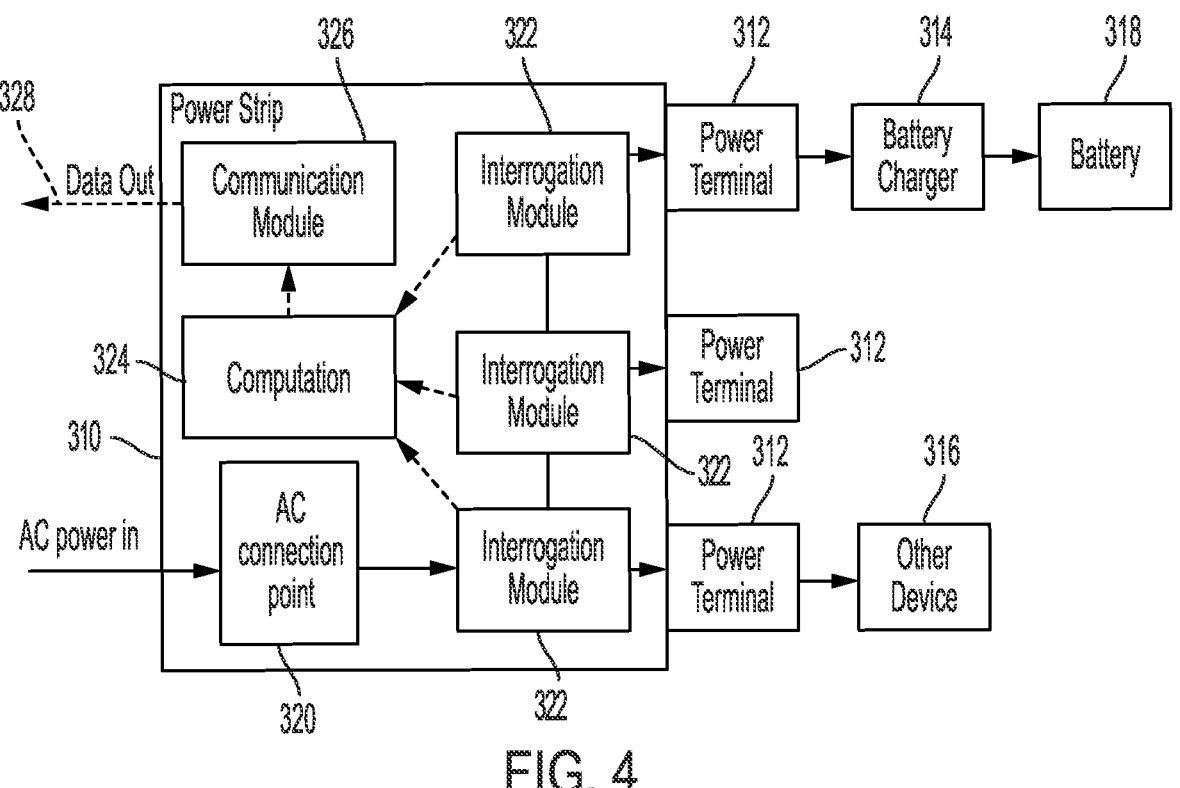
FIG. 4 is a block diagram conceptually illustrating example electronic components of a power strip in accordance with another embodiment of the present invention.

In another embodiment, as shown in FIG. 4, a power strip 310 includes power terminals 312, a supply power connection point 320, a computation module 324, and a communication module 326 (which are substantially similar to the power terminals 112, supply power connection point 120, computation module 124, and communication module 126 described above). In this embodiment, the power strip 310 includes a number of interrogation modules 322 that corresponds to the number of power terminals 312. Each of the interrogation modules are substantially similar to the interrogation module 122 described above and are operably coupled to one of the power terminals 312. Although three interrogation modules 322 and power terminals 312 are shown, the invention is not limited as such and any suitable number of power terminals 312 and corresponding interrogation modules 322 can be used. The power strip 310 can be disposed in a storage unit, such as, for example, a tool box or cabinet, that is substantially similar to the storage unit 100 described above. For example, the power strip 310 can be disposed in a containment space, such as for example, a drawer, on a work surface, or other suitable surface of the storage unit.

Similar to the power terminals 112 described above, the power terminals 312 are adapted to operably couple to a connected device, such as, for example, a battery charger 314, rechargeable electric devices 316 with integrated rechargeable battery(ies), such as, for example, battery powered lights, mobile phones, tablets, etc., and/or other electrically powered devices, to provide electricity thereto. The battery charger 314 is adapted to be operably coupled to and charge a battery 318 in a well-known manner. Similar to the storage unit 100 described above, the power strip 310 is adapted to determine a status of the connected device, such as, for example, a battery 318 coupled to a charger 314 and/or the battery(ies) of the rechargeable electric devices 316 in a similar manner as described above. The status may include, for example, charge state, charge cycles and/or battery health. The communication module 326 is adapted to then transmit data signals including the status of the connected devices using a wired connection and/or a wireless transmission 328 to one or more computing devices, such as one or more mobile computing devices and/or one or more remote servers.

The disclosed invention thus provides a power strip and/or a storage unit with the capability to interrogate or monitor the electricity (power, current, and/or voltage) that is supplied to a connected device with the intent to measure usage characteristics of the connected device and communicate this information to another device, network, and/or audio/visual system. The circuitry and placement of the interrogation, computation, and communication modules may vary from the disclosed arrangements to interrogate or monitor the electricity that is supplied to a device that is connected to an electrical power terminal.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A storage unit having containment spaces, the storage unit comprising:
   a power terminal adapted to operably couple and provide electricity to a connected device;
   an interrogation module operably coupled to the power terminal, adapted to interrogate electric supply information including at least one of power, current, and voltage of electricity supplied to the connected device via the power terminal, and adapted to send an electric supply data signal based on the electric supply information;
   a computation module operably coupled to the interrogation module and adapted to receive the electric supply data signal and determine a status of the connected device; and
   a communication module operably coupled to the computation module and adapted to receive a status data signal from the computation module and communicate the status data signal to a remote computing device.

2. The storage unit of claim 1, wherein the power terminal is disposed on a power strip.

3. The storage unit of claim 1, wherein the interrogation module includes any one of a voltmeter, an ammeter, and a wattmeter.

4. The storage unit of claim 1, wherein the connected device is a battery operably coupled to the power terminal via a battery charger.

5. The storage unit of claim 1, wherein the status includes one or more of a charge state, number of charge cycles, and battery health.

6. The storage unit of claim 1, wherein the computation module is adapted to determine the status of the connected device by comparing the electric supply data signal to an electric consumption profile.

7. A power strip having a power terminal adapted to operably couple to and provide electricity to a connected device, the power strip comprising:

an interrogation module operably coupled to the power terminal, adapted to interrogate electric supply information including at least one of power, current, and voltage of electricity supplied to the connected device via the power terminal, and adapted to send an electric supply data signal based on the electric supply information;

a computation module operably coupled to the interrogation module and adapted to receive the electric supply data signal and determine a status of the connected device; and a communication module operably coupled to the computation module and adapted to receive a status data signal from the computation module and communicate the status data signals to a remote computing device.

8. The power strip of claim 7, wherein the interrogation module includes at least one of a voltmeter, an ammeter, and a wattmeter.

9. The power strip of claim 7, wherein the status includes at least one of a charge state, number of charge cycles, and battery health.

10. The power strip of claim 7, wherein the computation module is adapted to determine the status of the connected device by comparing the electric supply data signal to an electric consumption profile.

11. A method performed by a computing device to communicate a status of a connected device operably coupled to and adapted to receive electricity supplied by power terminals disposed in a storage unit, the method comprising:

receiving an electric supply data signal from an interrogation module containing information including at least one of power, current, and voltage of electricity supplied to the connected device;

determining a status of the connected device; and communicating, via a communication module, a status data signal indicating the status to a remote computing device.

12. The method of claim 11, further comprising: displaying the status on a display of the remote computing device.

13. The method of claim 11, wherein determining the status of the connected device includes comparing the electric supply data signal to an electric consumption profile.

* * * * *